United States Patent [19]

Frey

[11] 4,094,599
[45] June 13, 1978

[54] FLEXIBLE MAGAZINE SLIDE PROJECTOR WITH MOVABLE LENS

[76] Inventor: Gerald J. Frey, 1486 Cantera Ave., Santa Barbara, Calif. 93110

[21] Appl. No.: 826,550

[22] Filed: Aug. 22, 1977

[51] Int. Cl.² .......................... G03B 1/48; G03B 21/20; G03B 23/08
[52] U.S. Cl. ..................................... 353/96; 353/101; 353/102; 353/109
[58] Field of Search ................... 353/96, 101, 102, 109

[56] References Cited

U.S. PATENT DOCUMENTS

| 3,729,254 | 4/1973 | Frey | 353/109 |
| 3,990,790 | 11/1976 | Styles | 353/109 |

Primary Examiner—Steven L. Stephan
Attorney, Agent, or Firm—Fulwider, Patton, Rieber, Lee & Utecht

[57] ABSTRACT

A slide projector for use with magazines of the flexible type in which slides are supported for movement around a closed-loop path and are swingable one by one into and out of a slide-projection station about an axis defined by a rotary drive shaft. The magazine has individual clip-type slide-holding elements that slide along an endless path and have frames in which slides are held. A condensing lens is mounted and guided for movement from a normal operating position close to the slide-projection station and in the path of the slides, to a retracted position out of the path, with a combined reciprocating and swinging motion, and is moved back and forth by a rotary crank mechanism that is driven by the slide-feeding mechanism, to shift the lens rapidly out of and back into the operating position during each slide change, with a dwell in the retracted position for the change.

18 Claims, 8 Drawing Figures

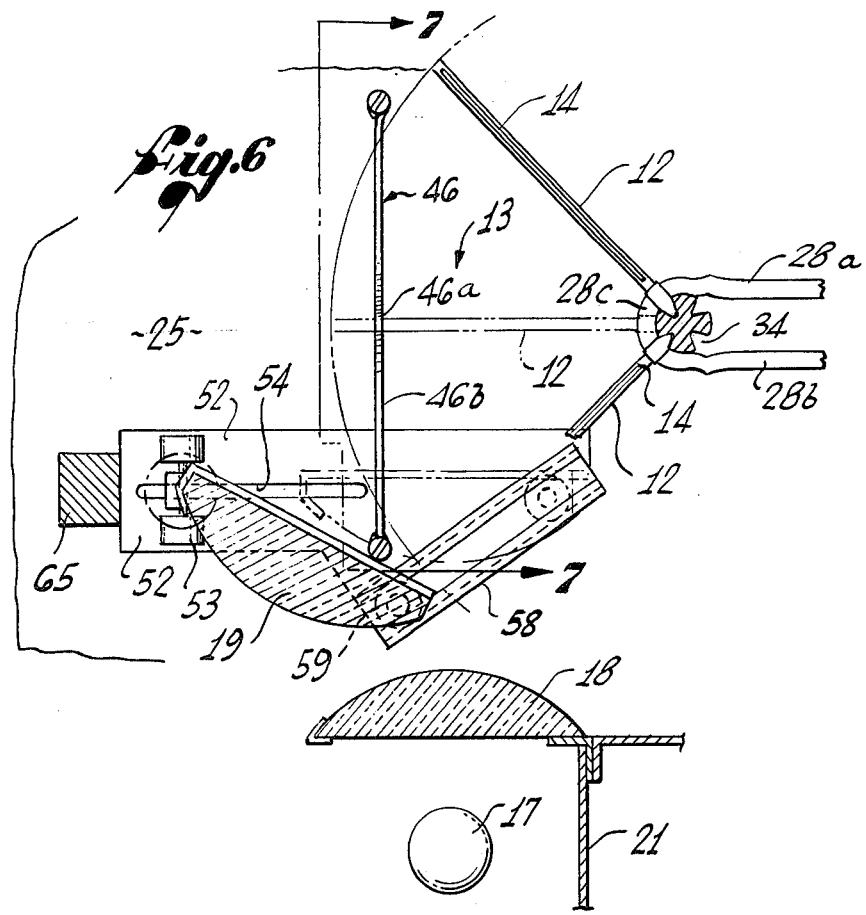
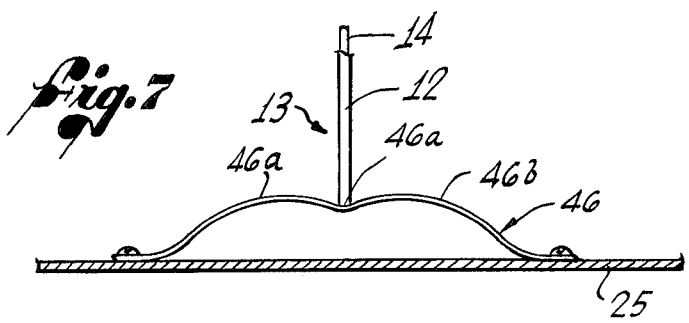
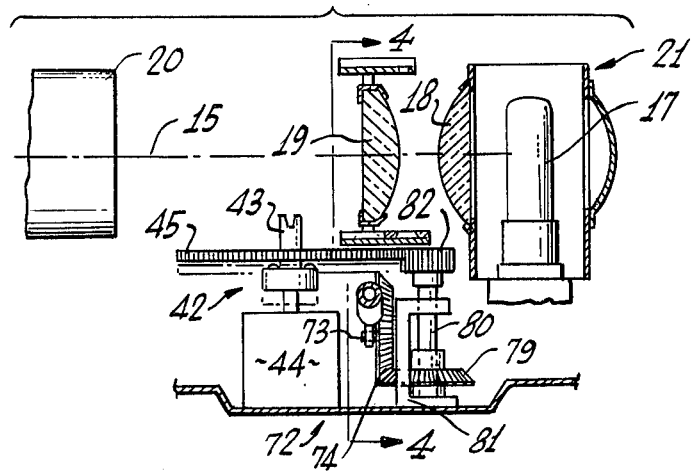

FLEXIBLE MAGAZINE SLIDE PROJECTOR WITH MOVABLE LENS

BACKGROUND OF THE INVENTION

This invention relates to slide projectors, and has particular reference to slide projectors of the type in which slides in a flexible magazine are swung one by one into and out of a slide-projection station or filmgate, about an axis extending along one side edge of the slide and positioned along one side of the filmgate.

One slide projector of this general type, shown in U.S. Pat. No. 3,729,254, is of the belt type in which a plurality of slides are held in a magazine comprising an endless flexible belt with a series of slide-holding elements in the form of metal clips mounted on its outer side. This belttype magazine is fitted around two parallel shafts, one alongside the slide-projection station, and is driven step by step by turning of one of the shafts through 90° increments. A functionally similar flexible magazine of more recent development, mounts an endless series of slide-holding elements, preferably molded plastic parts, individually and slidably on track defining an endless path that may be virtually the same in shape as the slide path in a belt-type projector.

In magazines of both of these types, slides moving into and out of the projection station swing through a tight arc of approximately 90°, typically about the axis of the drive shaft, and along a U-shaped section of track in the track-type projector. Such arcuate swinging movement feeds each slide into the projection station, in which the slide is positioned across the optical axis of the projector, in line with the various lenses and the light source. This is to be contrasted with the movement of slides in more conventional projectors in which slides held in a rigid magazine, whether straight or annular, are shifted edgewise out of the magazine for projection, and then are returned to the magazine for indexing movement.

The advantages of flexible-magazine projectors now are well known, and include, among others, smooth and rapid slide changing, as fast as four or more per second, jam-free operation, and compact slide storage. One disadvantage of past configurations, however, has been the distance that the condensing lens must be maintained from the slide-projection station, to permit the slides to swing into and out of the station. Because of the length of the slides, the condensing lens has had to be spaced a considerable distance behind the station, to be out of the arc of slide movement.

As a result of this distance, it has been necessary to use relatively large and expensive condensing lenses in order to project slides with acceptable brightness and high quality. Efforts have been made to minimize the lens size and cost with specially designed lenses, but as far as is presently known, these efforts have not solved the problem satisfactorily.

The principal objective of this invention is, therefore, the provision of a unique slide projector of the flexible-magazine type in which a conventional lens may be disposed in the optimum position for projection purposes, without detracting from, or interfering with, the operation of the projector.

SUMMARY OF THE INVENTION

The present invention resides in a projector of the foregoing character in which a lens is mounted for back and forth movement between a normal, slide-projecting position close to the slide-projection station and within the path of arcuate movement of the slides, and a retracted position spaced from the slide path, and is moved back and forth between these positions by a mechanism that is driven as an incident to, and in timed relation with, the feeding of the slides. As the slide-feeding mechanism starts the slide-changing operation, the lens is shifted quickly out of the slide path. Then as the slide reaches the projecting position, the lens is returned quickly to its normal position, ready for use.

Specific features of the invention are the manner of mounting, movably supporting and guiding the lens, particularly to pivot as well as to reciprocate the lens during its movement, and the drive mechanism for moving the lens with, and as an incident to, feeding of the slides, to provide for a momentary dwell of the lens in the retracted position between rapid retracting and return movements. Other features and advantages will become apparent from the following detailed description, taken in conjunction with the accompanying drawings.

BRIEF DESCRIPTION OF THE DRAWINGS

FIG. 6 is a further enlarged view similar to parts in FIG. 2, but showing the lens in its retracted position as slides are being moved into and out of the projection station;

FIG. 7 is a partial cross-sectional view taken along line 7—7 of FIG. 6; and

FIG. 8 is a partial cross-sectional view taken substantially along line 8—8 of FIG. 2.

DETAILED DESCRIPTION

Figure 2:
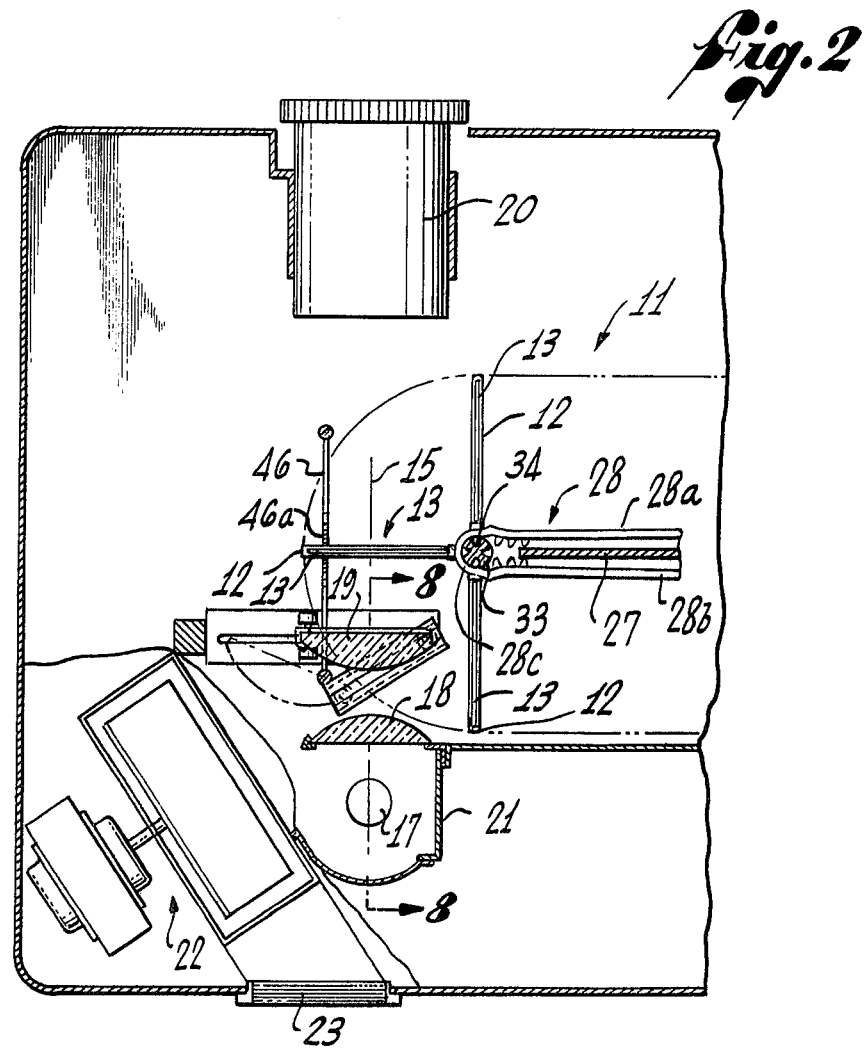
FIG. 2 is an enlarged fragmentary cross-sectional view, taken substantially along line 2—2 of FIG. 1, showing the position of the magazine in the projector, and the condensing lens in the normal position, the retracted position being indicated in broken lines.

As shown in the drawings for purposes of illustration, the invention is embodied in a slide projector 10 for use with a flexible slide holder or magazine 11 of the type having an endless series of slide-holding elements 12 that are movable along an endless path to be fed one by one into a slide-projection station 13 in the projector. In the projection station, the slide 14 in the element 12 extends across an optical axis 15 along which are arranged (as shown in FIGS. 2 and 8) a light source in the form of a lamp 17, two condensing lenses 18 and 19, the slide-projection station 13, and a focusing lens unit 20. The lamp is partially enclosed in a baffle 21 with the lens 18 mounted in its front wall, and is cooled by a fan 22 (FIG. 2) which circulates air through the housing of the projector 10 and through vents 23 in its rear wall.

Figure 1:
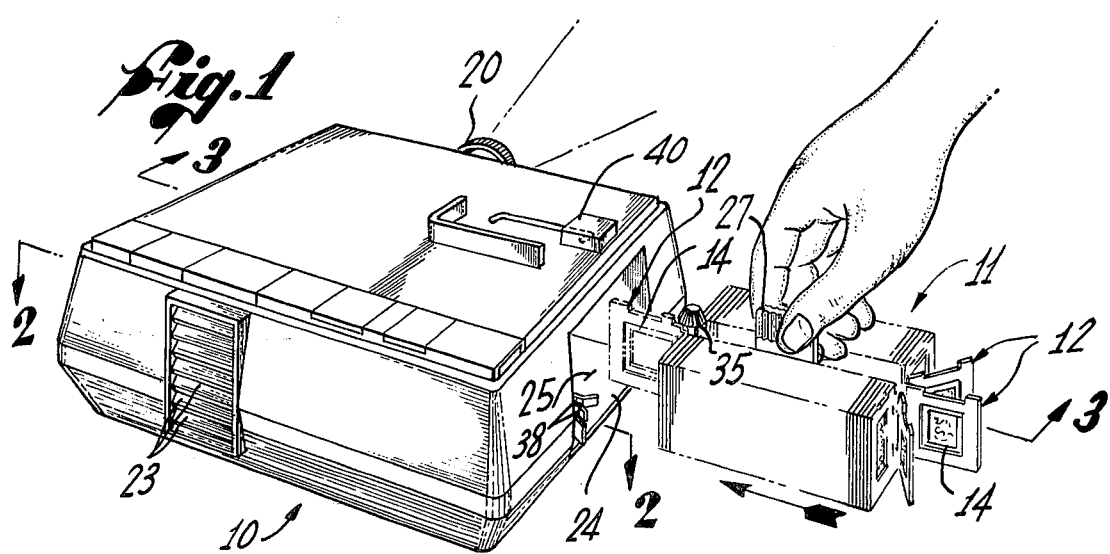
FIG. 1 is a perspective view of a slide projector embodying the novel features of the present invention, shown with a flexible magazine of the track type positioned for insertion in the projector, the eventual position of one slide being shown in broken lines.
Figure 3:
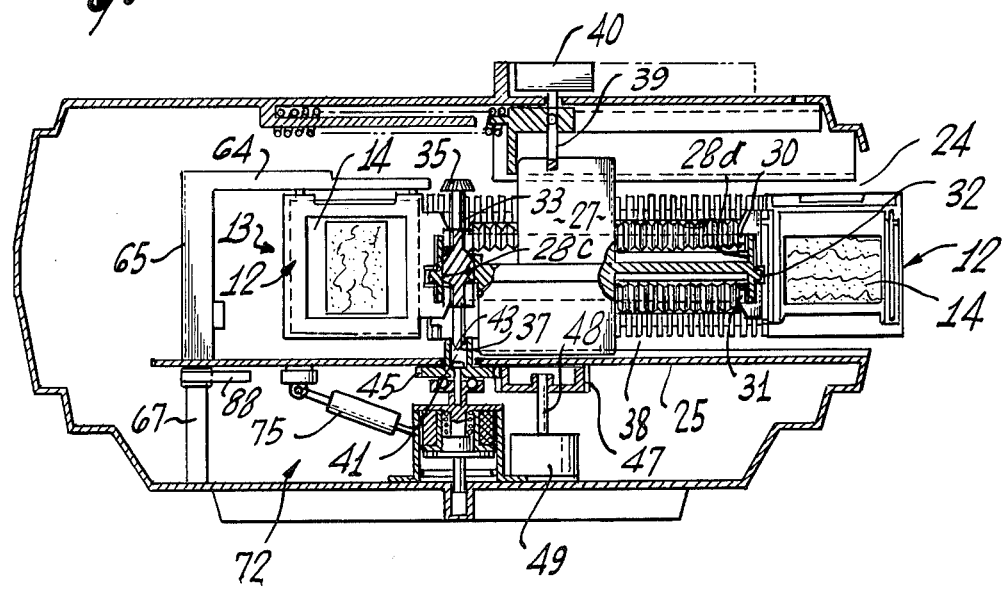
FIG. 3 is an enlarged partial cross-section taken substantially along line 3—3 of FIG. 1, with the magazine in place and a slide in the projection station partially broken away.

In the illustrative projector 10, the optical axis 15 extends through the left-hand portion of the housing, as viewed in FIGS. 1, 2 and 3, and the magazine is positioned in the right-hand portion, being inserted through an opening 24 in the right side and held on a central partition wall 25 of the projector. Beneath this wall are the drive mechanisms, only partially shown herein, for feeding slides in the magazine one by one into and out of the projection station 13. Various controls, the details of which are not significant for purposes of the invention, are provided on the projector and within its housing.

In the illustrative magazine, and also in the functionally similar belt-type magazine of the aforesaid patent, the slide-holding elements hold the slides 14 with one edge of each slide adjacent the holder, and are mounted in a closed-loop series to travel along an endless path, having two elongated and substantially straight sections along the sides of the magazine, and an arcuate section at each end of the magazine. At one end, the right end in FIG. 1, the slides and the elements flare and travel arcuately from one side section to the other, and at the other end, the movement of the elements is controlled so that one slide projects outwardly, to the left in FIG. 1, to lie in the projection station 13, while the adjacent slides are disposed at ninety-degree angles with the slide in the projection station.

Such positioning is accomplished in the belt-type magazine (not shown) by mounting the belt around two parallel shafts, the one alongside the projection station 13 being of square cross-section and being driven in steps of ninety degrees to feed the belt and the slides step by step along the path. In the illustrative track-type magazine, the slide-holding elements 12 are separate molded plastic parts, shown most clearly in FIGS. 1 and 3, comprising generally rectangular frames into which slides are inserted through open upper sides, and specially grooved hangers on the inner sides of the frames (the sides closest to the tracks) for holding the elements slidably on the magazine. The front and rear sides of the slide-holding elements have openings through which light can be projected through the central transparent portions of the slides. It should be noted, however, that numerous different configurations may be used for the slide-holding elements, this being merely an illustrative type.

The detailed structure of the remainder of the magazine is not an essential part of the present invention, and thus will be described only generally herein. As shown in FIGS. 1, 2 and 3, the magazine has a vertical plate 27 as its central structural element, and has a substantially continuous rail 28 that forms the tracks for the solid-holding elements 12. The rail has two elongated and parallel straight side sections $28^a$ and $28^b$, and two arcuate connecting sections $28^c$ and $28^d$, and is joined to the central plate 27 by a horizontal web 29 located approximately midway between the upper and lower edges of the rail 28.

As shown in FIG. 3, the hangers on the inner sides of the clip-type slide-holding elements 12 include fingers 30 and 31 which fit around the rail 28 from above and below, and cooperate to define a dovetail-type sliding connection between each element and the rail. An external rib 32 on the rail fits closely in notches in the inner sides of the frames, to stabilize the elements as they slide on the rail.

A drive shaft 33 is rotatably mounted inside the arcuate connecting section $28^c$ of the rail 28, at the left end of the magazine, and has an enlarged central portion that is formed with four drive grooves 34 at intervals of ninety degrees around the shaft. A knob 35 on the upper end provides for manual rotation of the shaft, and the lower end 37 is shaped for driving engagement with the drive mechanism of the projector.

To couple the slide-holding elements 12 to the drive shaft 33, the inner sides of the fingers 30 and 31 are shaped and positioned to fit into the drive grooves 34 in the enlarged central portion of the drive shaft. In this instance, these inner sides are V-shaped in horizontal cross-section, as shown in FIGS. 2 and 6, and the grooves in the shaft are correspondingly shaped, to couple the elements securely to the shaft. As the shaft is turned through an angular step of 90° in either direction from the position shown in FIG. 2, the slide 14 in the projection station 13 is swung 90° to one of the laterally projecting positions while the slide in that position is moved onto the adjacent side section of the track. At the same time, the slide in the other laterally projecting position is moved into the projection station 13, and a slide at the end of the other straight side section is picked up by the shaft, preparatory to being moved into the projection position during the next angular step of the shaft. The projector typically will be reversible in operation, which requires only a reversible, stepping drive for the shaft 33.

Insertion of a loaded magazine 11 into the illustrative projector 10 is accomplished in the manner shown in FIG. 1, holding the upwardly projecting tab formed by the upper edge portion of the central plate 27 as the magazine is fitted into the side opening 24. The downwardly projecting lower edge portion of the central plate (see FIG. 3) slides between and is held by two elongated guides 38 (FIGS. 1 and 3), until the magazine reaches its fully inserted position (FIGS. 2 and 3). Then, the upper tab receives a latching stud 39, depending from a manual latching knob 40 accessible from the top of the projector, which latches the magazine in the operative position.

Prior to insertion in the projector, the magazine 11 preferably is in the condition shown in full lines in FIG. 1, with no slide holder in the position shown on the left in broken lines. At the same time, the lower end of the shaft 33 is moved into alignment with an opening 41 through the partition wall 25, for coupling engagement with the drive mechanism. After insertion of the magazine, a slide is moved to the broken-line position in FIG. 1, shown in FIGS. 2 and 3, by rotation of the drive shaft 33, thus being positioned in the filmgage or slide-projection station 13, ready for projection. The slide is held releasably in the proper plane by the combined action of the grooves 34 and a novel positioning device comprising a bow-shaped spring wire 46, shown in FIGS. 2, 6 and 7, that defines a yieldable cradle or notch $46^a$ for the undersides of the holders. The notch $46^a$ is aligned with the active groove 34, in the plane of the slide-projection station, yet the higher portions $46^b$ of the wire on opposite sides of the plane are freely yieldable to admit slides into and out of the notch, when the holders are driven by the shaft.

The representative actuating means for feeding the slides 14 in the projector 10 includes a solenoid-operated coupling mechanism 42 having a drive coupling 43 which projects upwardly beneath the drive shaft 33 for engagement with the lower end of the shaft, through the opening 41. This drive coupling is a continuation of the core of a solenoid operator 44 mounted beneath the partition wall 25, the solenoid being operable, when energized, to raise the coupling into engagement with the drive shaft, which becomes part of the actuating means when the magazine is in the projector.

Rotary motion is imparted to the drive coupling 43 through a gear 45 that is fastened to the coupling beneath the partition wall 25. The gear 45 meshes on one side with the output gear 47 (FIG. 3) on the output shaft 48 of a suitable reversible drive means 49, shown only generally herein, for producing ninety degrees of rotation of the drive coupling, and thus the drive shaft 33, during each slide-changing cycle.

A distinguishing characteristic of both the illustrative track-type magazine 11 and the prior flexible-belt magazines is the swinging of the slides 14 into and out of the projection station 13 about an axis extending along one side edge of the slide, defined by a drive shaft, a track, or both, as opposed to the edgewise insertion that is typical of conventional magazines, whether they are straight or annular in overall shape. Because of this distinguishing characteristic, it has been thought necessary to position the condensing lens 19 a considerable distance from the projection station 13, to allow clearance for swinging of the slides. The result has been a necessity to increase the size, and thus the cost, of the condensing lenses in order to project slides with acceptable quality.

In accordance with the present invention, the condensing lens 19 normally is positioned as close to the projection station 13 as is necessary for optimum projecting effectiveness (and this is within the path of the slides 14), and is moved out of this normal operating position, to a retracted position clear of the slide path preparatory to a slide change, and then is moved back into the proper operating position as the slide change is completed. Such movement of the condensing lens is accomplished rapidly and quietly by a relatively simple actuating mechanism operating in timed relation with the feeding of the slides, and does not detract from the performance of the projector.

In this instance, the condensing lens 19 has a lens mount in the form of a frame 50, and is supported on the projector 10 by means of upper and lower tracks 51 and 52 for movement into and out of the operating position. The lower track 52 (FIGS. 2 and 6) is formed on top of the partition wall 25, and is substantially parallel to the plane of the projection station, extending from beneath the outer side of the lens in its normal position, the side remote from the holder, outwardly along the partition wall. Two follower rollers 53 are mounted on the outer lower corner of the lens frame and straddle a slot 54 in the center of the track. A stud 55 (see FIG. 5) extends downwardly through the slot from a body 57 between the rollers 53, the outer side of the lens 19 thus being guided by the slot for straight in-and-out motion.

Figure 4:
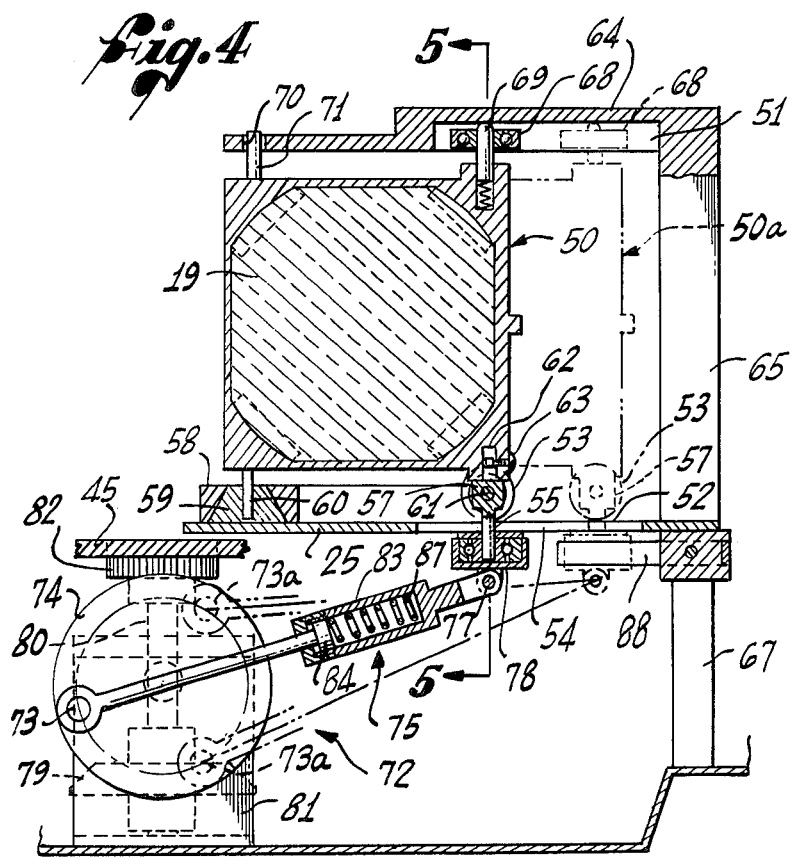
FIG. 4 is an enlarged partial cross-section taken substantially along line 4—4 of FIG. 8.

While movement of the lens 19 could be limited to such straight in-and-out motion, smoother and more rapid retraction is accomplished by moving the inner side of the lens, the side closest to the holder, along a different, non-parallel line, and thereby pivoting as well as reciprocating the lens. For this purpose, a second lower track 58 extends outwardly from beneath the normal position of the inner side of the lens, along a line that is generally radial relative to the arcuate path of the slides, and inclined relative to the track 52, as shown most clearly in FIGS. 2 and 6. This track is a grooved bar that is mounted on the partition wall 25, and receives a conically tapered follower roller 59 that is rotatably mounted on the lens frame beneath the inner corner of the lens, on a depending pin 60 as shown in FIG. 4. The groove walls are inclined to converge toward the open side of the groove in order to confine the roller 59 slidably in the groove.

Figure 5:
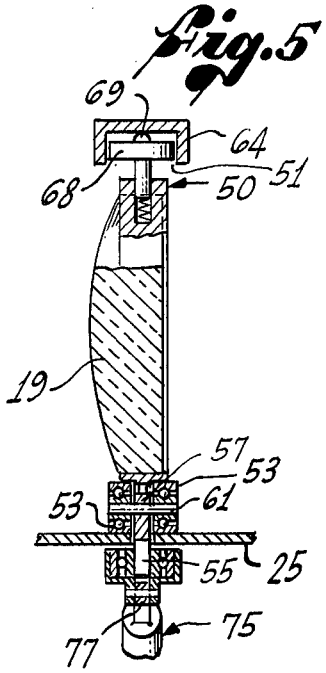
FIG. 5 is a partial cross-section taken along line 5—5 of FIG. 4.

The swinging of the lens 19 is accommodated by a swivel connection between the follower rollers 53 and the frame 50, one suitable connection being shown in FIGS. 4 and 5. The two rollers, which preferably are roller bearings as shown, are mounted on an axle pin 61 that extends through the central body 57, and a swivel pin 62 extends upwardly from the body into a bore in the frame. An annular groove around the upper end portion of this loosely receives the end of a retaining screw 63, which thus holds the pin in the bore while permitting it to turn as a swivel.

The upper track 51 is included in the projector 10 to provide more firmly guided support for the movable lens 19 (see FIG. 4). In this instance, it is a groove in the underside of a horizontal arm 64 projecting laterally over the lens from the upper end of a post 65. The latter projects upwardly from the partition wall 25 and preferably is braced by an extension 67 beneath the partition wall. The groove of the upper track receives a follower roller 68 on a pin 69 projecting upwardly from the frame adjacent the upper outer corner, this groove being aligned with the lower track 52. The pin 69 is spring-urged upwardly into the groove, and has a rounded upper end, as shown in FIGS. 4 and 5.

If desired, a second upper track 70 may be provided to correspond to the lower track 59, in the form of a slot (FIG. 4) that is formed in the free inner end portion 64$^a$ of the arm 64 to receive a follower pin 71 that projects upwardly from the frame 50 adjacent the inner corner of the lens. The pin 71 is coaxial with the tapered roller 59, and the upper roller 68 is coaxial with the lower swivel pin 62, so that identical motions are imparted to the two inner corners and to the two outer corners by their respective cam-and-follower arrangements.

To move the condensing lens 19 in timed relation with the drive shaft 33, a rotary crank mechanism 72 (FIGS. 3, 4 and 8) is connected to the lens assembly, herein at the lower outside corner of the lens frame 50, and is driven by gearing having as its input the same gear 45 that is the input to the drive coupling 43. More specifically, as shown in FIGS. 4 and 8, the rotary crank mechanism comprises a crank pin 73 mounted on one side of a bevel gear 74, near the outer periphery thereof, and a connecting rod 75 journaled at one end on the crank pin and pivotally connected at the other end to a pin 77 carried on a roller bearing 78 mounted on the lower end of the stud 55 depending from the follower rollers 53 through the slot 54 in the partition wall 25. Thus, as the bevel gear 74 rotates through one revolution from the position shown in full in FIG. 4, the connecting rod 75 is first shifted to the right to move the lens assembly to the right, outwardly away from the magazine 11, and then is shifted back to the left to return the lens assembly to its original position.

The gearing (see FIG. 8) between this crank mechanism 72 and the input gear 45 includes the bevel gear 74 carrying the crank pin 73, a second bevel gear 79 mounted adjacent the bottom wall of the housing on the lower end portion of an upright shaft 80, supported in a C-shaped bracket 81, and a pinion gear 82 carried on the upper end of the shaft 80. This gear meshes on one side with the input gear 45. The gears are selected to produce one full revolution of the crank pin 73 for 90° of rotation of the input gear 45.

In order to move the condensing lens 19 quickly out of its normal operating position, prior to movement of a slide 14 to that position, the crank mechanism 72 is designed to accomplish such movement during substantially less than one-half of its revolution, as the slide movement is just commencing. For this purpose, the "throw" of the crank mechanism (the preselected length of effective lateral movement, longitudinally of the connecting rod 75) is made substantially greater than the amount of required movement of the outer side of the condensing lens, and a spring-loaded, lost-motion connection is provided in the connecting rod to absorb the excess crank throw while holding the lens in the retracted position. Then, during return motion of the crank pin, the lost-motion connection maintains the lens in the retracted position until the lost-motion connection has been extended, and only then returns the lens to its normal position, thus providing a substantial interval for passage of a slide.

As shown most clearly in FIG. 4, the lost-motion connection is formed by a cylinder 83 that is connected to the lens assembly to form one end portion of the connecting rod, and a piston 84 slidably fitted in the cylinder, and mounted on a piston rod 85 that extends out of the free end of the cylinder to the crank pin 73, thus forming the other end portion of the connecting rod. A coiled compression spring 87 in the cylinder urges the piston rod toward its extended position, and yields to permit the piston to move to the right in the cylinder, thereby absorbing excess throw by shortening the effective length of the connecting rod, and also cushioning the initial shock on the lens.

In the illustrative embodiment, approximately the first one-third of a revolution, from the full-line position of the crank pin 73 in FIG. 4 to one of the broken-line positions 73$^a$ in FIG. 4 (depending upon whether operation is forward or reverse) fully retracts the lens assembly, to the broken-line position of the frame indicated at 50$^a$ in FIG. 4. The throw resulting from the remaining motion of the crank pin, between the two positions 73$^a$, is absorbed by the contraction of the lost-motion connection, which then elongates to restore the absorbed motion before returning the lens assembly to its operating condition.

The lens-moving mechanism is surprisingly quick and smooth in its operation, and has little tendency toward an increase in operating noise. It will be apparent, however, that the stopping of the lens assembly in the retracted position is sudden and requires resistance to further movement by the contracting connecting rod. To do this without excessive jarring and noise, a resilient bumper cushion 88 is provided to engage and quietly stop the lens assembly, preferably being positioned on the lower extension 67 of the post 65, in the path of the roller bearing 78. This bumper cushion thus cooperates with the lost-motion connection in cushioning the lens movement.

From the foregoing, it should be apparent that the present invention makes it possible to position the condensing lens 14 in its optimum position, regardless of the slide path, by combining the movably mounted lens with means for moving it between its two positions in timed relation with the feeding of slides, and also obtains the desired rapid movement in a relatively simple manner that provides ample time for slide movement between the in-and-out motions, of the lens assembly. It also will be evident that, although a preferred embodiment has been illustrated and described, various modifications and changes may be made without departing from the spirit and scope of the invention.

I claim:

1. In a slide projector having:
    an optical system including an optical axis, a slide-projection station along said axis in a plane substantially perpendicular to the axis, and a condensing lens along said axis closely adjacent to one side thereof, for directing light from a light source through a slide positioned in said station,
    means supporting a series of slides in said projector for movement along an endless, closed-loop path including two substantially straight side sections and two arcuate connecting sections at the opposite ends of said side sections, one of said end sections being located alongside said slide-projection station for swinging of slides along an arcuate path into and out of the slide-projection station, through arcs of approximately ninety degrees and generally about an axis defined by said one arcuate section, said lens having an inner side adjacent said one arcuate section, an outer side remote from said one arcuate section, and upper and lower sides,
    and actuating means for feeding slides along said path and into and out of the slide-projection station,
    the improvement comprising:
    means movably supporting said condensing lens on said projector including:
    first and second tracks associated, respectively, with the outer and inner sides of said lens, said first track extending outwardly from said outer side substantially parallel to said plane, and said second track extending outwardly from said inner side substantially radially of said arcuate path and being inclined relative to said first track,
    and follower means on said frame for riding on said tracks and guiding the lens for movement thereon to swing the lens about said outer side as the lens moves along said tracks;
    lens-moving means for shifting the lens back and forth along said tracks in timed relation with the feeding of slides along said track by said actuating means, between the normal position in which said lens is closely adjacent the slide-projection station and a retracted position spaced outwardly from said normal position away from said one arcuate section and out of the slide path, including:
    a rotary crank mechanism having a lateral throw of preselected length during each revolution,
    a connecting rod connected at one end to said crank mechanism and at the other end to said lens, adjacent said outer side, to shift said outer side back and forth along said first track between said positions during each revolution,
    a spring-loaded lost-motion connection between said crank mechanism and said lens,
    and means for stopping outward movement of said lens at said retracted position before the lateral throw of the crank mechanism is complete, thereby to hold the lens stationary in the retracted position during a portion of each revolution,
    and means driving said crank mechanism with said actuating means to produce one revolution of the crank mechanism during each slide change.

2. A slide projector as defined in claim 1, in which said follower means comprise rollers riding on said tracks.

3. A slide projector as defined in claim 1 in which said tracks are provided beneath the lens, and said supporting means include at least one additional track above the lens.

4. A slide projector as defined in claim 1 in which said crank mechanism has a throw sufficient to move said lens to said retracted position in approximately onethird of said revolution.

5. A slide projector as defined in claim 1 in which said means for stopping the lens is a resilient cushion.

6. In a slide projector having:
an optical system including an optical axis, a slide-projection station along said axis, and a condensing lens along said axis adjacent said station, for directing light through the station;
a shaft along one side of said station;
an endless series of slide-holding elements supported in said projector for movement along an endless path to and from said shaft, with an arcuate portion of the path extending around the shaft, each of said elements being adapted to hold a slide with one edge adjacent the shaft along said arcuate portion and with the opposite edge spaced a preselected distance outwardly from the shaft, and to swing each slide through an arc of approximately ninety degrees into the slide-projection station as the element moves around the shaft to the side thereof adjacent the slide-projection station;
and actuating means for turning the shaft step by step through ninety-degree increments to feed slides one by one into and out of the slide-projection station;
the improvement comprising:
means supporting said condensing lens in a normal position in which the lens is disposed across said optical axis closely adjacent one side of the slide-projection station, and is closer to said shaft than said preselected distance so as to lie within the path of the slides, and for movement away from said shaft to a retracted position in which said lens is spaced from the shaft a distance greater than said preselected distance;
and means driven by said actuating means in timed relation with the turning of said shaft, for moving said lens to said retracted position as the shaft begins to turn, and returning the lens to said normal position after a slide has passed.

7. In a slide projector having:
an optical system including first and second lenses spaced apart along an optical axis, a slide-projection station located between said lenses and in a plane substantially perpendicular to said axis, and means for supporting a light source to project light along said optical axis through said lenses and a slide in said station,
an endless flexible slide holder having a series of slide-holding elements movable along an endless path, and
means supporting said slide holder on one side of said optical axis for movement of said elements one by one into the slide-projection station, and including means defining a pivotal axis along one side of the station for swinging of each slide-holding element through an arc of approximately ninety degrees in moving a slide into and in moving a slide out of the slide-projection station;
the improvement which comprises:
a lens mount for holding said first lens;
means supporting said lens mount on the projector for selective movement between a normal position in which said first lens is properly positioned across said optical axis and also lies in the path followed by the slides on one side of the slide-projection station during swinging of a slide-holding element about said pivotal axis, and a retracted position in which said first lens is spaced from said normal position and is clear of said path;
actuating means for driving the slide holder step by step to feed the slide-holding elements along said path and to swing slides held by said elements one by one into and out of said slide-projection station;
and lens-moving means for shifting said lens mount back and forth to move said first lens between said normal and retracted positions in timed relation with the feeding of the slide-holding elements, withdrawing said first lens from said path prior to movement of a slide to said slide-projection station and returning the first lens to said normal position after the slide has passed.

8. A slide projector as defined in claim 7 in which said lens-supporting means include track means on said projector, and follower means on said lens mount, said track means extending outwardly away from said slide holder from said normal position.

9. A slide projector as defined in claim 8 in which said first lens has inner and outer sides disposed on opposite sides of said optical axis when the lens is in said normal position, said inner side being the side closest to the slide holder, and in which said follower means comprise inner and outer followers and said track means comprise a first track for said outer follower extending outwardly substantially parallel to the plane of said slide-projection station, and a second track for said inner follower extending outwardly substantially radially of the arcuate portion of the path, thereby to swing the first lens away from said pivotal axis during movement of the lens from the normal position to the retracted position.

10. A slide projector as defined in claim 7 in which said actuating means include a shaft which also defines said pivotal axis, and drive mechanism for turning said shaft step by step through ninety degree increments, and said lens-moving means comprise a rotary crank mechanism driven with said shaft through one revolution for each step of said shaft, said crank mechanism having a connecting rod connected to said lens to shift the latter outward and then back during each revolution of the crank mechanism.

11. A slide projector as defined in claim 10 in which said connecting rod has a yieldable lost-motion connection between its ends, and said crank mechanism has a lateral throw that is substantially greater than the spacing between the two lens positions, thereby to move the first lens to the retracted position during the initial portion of a revolution, hold the lens in the retracted position during the intermediate portion for movement of a slide into the slide-projection position as the lost-motion connection contracts and then extends, and return the lens to the normal position during the final portion of the revolution, after the slide is in the slide-projection station.

12. A slide projector as defined in claim 11 in which said connecting rod comprises first and second telescoping parts, one connected to the rotary crank and one connected to said first lens, and a spring urging the parts away from each other to an extended condition.

13. A slide projector as defined in claim 11 in which the lateral throw of said rotary crank mechanism is sufficient to move said first lens from the normal position to the retracted position during approximately one-third of a revolution, and the lost-motion connection maintains the lens in the retracted position during approximately onethird of a revolution, after which the lens is returned to the normal position during the final approximately one-third of a revolution.

14. In a slide projector having:
  an optical system including a slide-projection station and a lens normally located on one side of said station to project light through a slide located in said station,
  means supporting a plurality of slides for movement along an endless, closed-loop path including two substantially straight side sections and an arcuate connecting section located alongside said slide-projection station, for swinging of slides along said arcuate section into and out of the slide-projection station,
  and means for feeding slides along said path and one by one into and out of the slide-projection station,
  the improvement comprising:
  means supporting said lens for back-and-forth movement between the normal position on one side of the slide-projecting station and a retracted position spaced farther from said slide-supporting means than the normal position, said lens being within the path of slides moving along said arcuate section when the lens is in said normal position, and being out of said path in said retracted position;
  and means operating in timed relation with said feeding means for shifting the lens between said positions in timed relation with the feeding of slides, to remove the lens from the slide path for passage of each slide, and to return the lens to the normal position after passage of each slide.

15. A slide projector as defined in claim 14 in which said lens has an inner side adjacent said arcuate section, and an outer side remote from said arcuate section and said supporting means includes means guiding said outer side for straight back and forth movement toward and away from said arcuate section, and means guiding said inner side for non-parallel movement to swing said inner side away from the arcuate section.

16. A slide projector as defined in claim 15 in which said guiding means for said outer side includes a track substantially parallel to the plane of the slide projecting station, and said guiding means for said inner side is a track that is generally radial relative to said arcuate section.

17. A slide projector as defined in claim 14 in which said means for shifting the lens comprises a rotary crank mechanism driven with the slide feeding means through one revolution for each slide change, and including a connecting rod connected to said lens, said crank mechanism having a lateral throw substantially greater than the spacing between said lens positions, and said connecting rod having a spring-loaded lost-motion connection for yielding and absorbing excess throw while holding the lens in said retracted position.

18. A slide projector as defined in claim 14 in which said supporting means comprise tracks on said projector, and follower rollers on said lens riding on said tracks.

* * * * *